United States Patent [19]
Takahashi

[11] Patent Number: 5,746,985
[45] Date of Patent: May 5, 1998

[54] REFORMING REACTOR

[75] Inventor: Tomonori Takahashi, Chita, Japan

[73] Assignee: NGK Insulators, Ltd., Nagoya, Japan

[21] Appl. No.: 877,513

[22] Filed: Jun. 17, 1997

Related U.S. Application Data

[63] Continuation of Ser. No. 439,448, May 11, 1995, abandoned.

[30] Foreign Application Priority Data

May 23, 1994 [JP] Japan ................... 6-108627

[51] Int. Cl.[6] .................................................. F01N 3/10
[52] U.S. Cl. ........................ 422/173; 422/174; 422/177; 422/178; 429/20; 429/120; 219/407; 219/408; 219/424; 219/457; 219/544
[58] Field of Search .................... 422/173, 174, 422/177, 178; 429/12, 17, 19, 20, 21, 40, 46, 120; 219/485, 407, 408, 409, 424, 426, 427, 457, 544, 546

[56] References Cited

U.S. PATENT DOCUMENTS

| | | | |
|---|---|---|---|
| 4,684,581 | 8/1987 | Struthers | 429/19 |
| 4,865,926 | 9/1989 | Levy et al. | 429/20 |
| 4,886,017 | 12/1989 | Viani | 122/4 D |
| 5,051,241 | 9/1991 | Pfefferle | 422/180 |
| 5,112,527 | 5/1992 | Kobylinski | 252/273 |
| 5,118,475 | 6/1992 | Cornelison | 422/174 |
| 5,229,080 | 7/1993 | Abe et al. | 422/174 |
| 5,248,566 | 9/1993 | Kumar et al. | 429/19 |
| 5,260,637 | 11/1993 | Pizzi | 320/6 |
| 5,266,278 | 11/1993 | Harada et al. | 422/174 |
| 5,306,470 | 4/1994 | Bak et al. | 422/174 |

FOREIGN PATENT DOCUMENTS 6-48701 A  2/1994  Japan .

*Primary Examiner*—Christopher Kim
*Attorney, Agent, or Firm*—Kubovcik & Kubovcik

[57] ABSTRACT

A reforming reactor is provided with a catalyst and a heating resistor. The heating resistor is embedded in a catalyst. A reforming reactor can start rapidly with high thermal efficiency and which is excellent in recovery of hydrogen.

4 Claims, 2 Drawing Sheets

REFORMING REACTOR

This application is a continuation of application Ser. No. 08/439,448 filed May 11, 1995, now abandonded.

BACKGROUND OF THE INVENTION AND RELATED ART STATEMENT

The present invention relates to a reforming reactor for producing hydrogen from a hydrocarbon or a hydrocarbon containing oxygen such as methane, propane, methanol, ethanol, and petroleum as a starting material. More particularly, the present invention relates to a reforming reactor used for supplying fuel hydrogen to a fuel cell of an automobile which power source is a combination of a fuel cell and a storage cell and to an improvement of a reforming reactor which produces hydrogen from a starting material such as methanol.

A reforming reactor has been conventionally used for recovering hydrogen from a material gas containing a hydrocarbon such as methane and/or a hydrocarbon containing oxygen such as ethanol. The gas is decomposed mainly into water and carbon dioxide by a steam reforming reaction and a CO-shift reaction. Heat for reaction is supplied to such a reforming reactor by heating directly or indirectly by catalytic combustion or with a burner.

Japanese Patent Laid-Open 6-48701 discloses that a lattice catalyst for combustion (honeycomb catalyst for combustion) used for a catalytic combustion apparatus of an indirect-heating type can reduce the pressure drop at the catalytic combustion apparatus and that an electric heater can uniformly heat the catalytic combustion apparatus at the stage of preheating.

The present applicant proposed, a system for producing high-purity hydrogen and a method for producing high-purity hydrogen. In the system, a gas containing a hydrocarbon such as methane and a hydrocarbon containing oxygen such as methanol, steam, and oxygen is supplied to a reforming reactor. The reforming reactor can subject the gas to combustion (partial oxidation), reformation, and shift reaction and gain heat inside the reforming reactor.

A reforming reaction using a conventional reforming reactor is hereinbelow described with reference to FIG. 4. In FIG. 4, a gas containing methane, ethanol, and steam is supplied to a reforming reactor 1. Mainly hydrogen and carbon dioxide are produced with a reforming shift catalyst 2 in a reforming reactor 1. The reformed gases are treated by a hydrogen-separating apparatus 3 as necessary, and hydrogen is recovered. Particularly, a hydrogen-separating film made of Pd alloy is used in a hydrogen-separating apparatus 3 in order to obtain high-purity hydrogen to be supplied to a fuel cell of an electric automobile. Unrecoverable hydrogen is discharged together with carbon dioxide.

Heat required for the aforementioned reforming reaction can be supplied by preheating a mixed gas containing methane, methanol, and oxygen in a preheater 4 having a burner or an electric heater, combusting the mixed gas in a catalytic combustion apparatus 5, and transmitting the obtained heat 6 to reforming reactor 1. Then, steam and carbon dioxide generated by preheating and catalytic combustion are discharged.

When the heat required for the reforming reaction is supplied by direct heating using a burner, a mixed gas containing combustion gas generated by catalytic combustion or a burner and a starting gas for reforming is supplied to a reforming reactor 1. In the system for producing high-purity hydrogen proposed by the present applicant, a mixed gas containing a preheated starting gas for reforming and oxygen is supplied to a reforming reactor 1 where internal heat is generated by causing catalytic combustion (partial oxidation) in the reforming reactor.

In the aforementioned system for producing hydrogen proposed by the present applicant, heat required for the reforming reaction (endothermic reaction) is supplied by generating a partial oxidation reaction (exothermic reaction) in the reforming reactor. The system is excellent in recovery of hydrogen per unit volume of hydrocarbon. However, the system has a room for improvement on the following points:

(1) In the starting stage until the temperature of the reforming reactor reaches a predetermined temperature by being heated using the aforementioned mixed gas which is preheated, the reforming reactor needs to be positively heated by an electric heater for preheating, a gas or heat transmission by means of a gas. Reforming reaction or partial oxidation reaction does not start before the temperature of the reforming reactor reaches a predetermined temperature, and non-reacted gas is discharged.

(2) A large amount of electric power is required for heating an electric heater for preheating, heating by a gas, or heating by heat transmission by means of a gas in the aforementioned starting stage.

(3) When hydrogen is selectively recovered by a hydrogen-separating film, hydrogen is not sufficiently recovered until the temperature of the hydrogen-separating film reaches a sufficiently high temperature for permeation of hydrogen by being heated using a gas formed by a reaction.

SUMMARY OF THE INVENTION

The present invention has been achieved in view of the aforementioned points. An object of the present invention is to provide a reforming reactor which can be started rapidly and with a high thermal efficiency and which is excellent in recovery of hydrogen.

Another object of the present invention is to provide a reforming reactor which is compact and for which electric-power consumption is decreased.

Therefore, one aspect of the present invention provides a reforming reactor which mixes at least one of hydrocarbons and hydrocarbons containing oxygen with a gas containing water and oxygen, gasifies the mixture, and partially oxidizes, decomposes, and reforms the hydrocarbons. The reforming reactor is provided with a catalyst for partial oxidation, decomposition and reforming reaction and a heating resistor.

DESCRIPTION OF THE INVENTION

Figure 1:
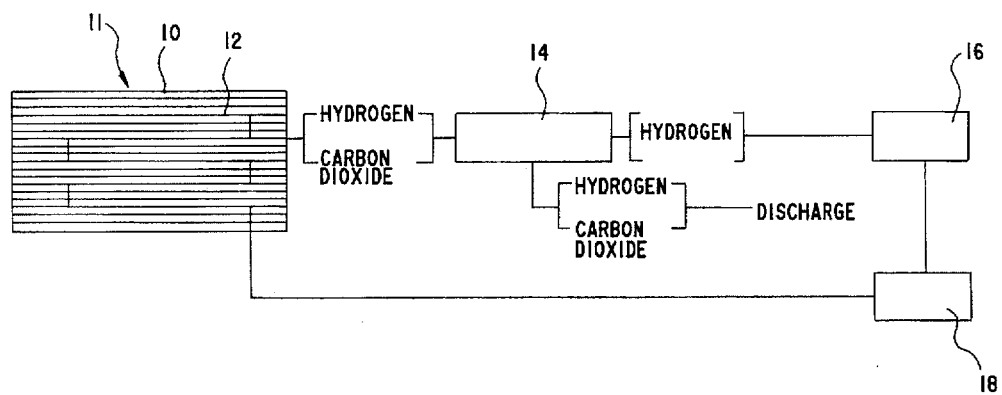
FIG. 1 is a schematic explanatory view showing an embodiment of a reforming reactor of the present invention.

In the present invention a heating resistor is disposed inside a reforming reactor. Therefore, the reforming reactor is excellent in heat transmission. Further, the reforming reactor can be easily started and discharge of non-reacted gas in the starting stage is decreased because temperatures of the reforming reactor and a catalyst for partial oxidation, decomposition and/or reforming reaction rapidly reach predetermined temperatures. When the heating resistor is embedded in a catalyst, he at can be transmitted to the catalyst more efficiently and the reforming reactor can be started more rapidly. Furthermore, when the heating resistor is formed to have a honeycomb configuration and the honeycomb resistor is used as a carrier for the catalyst, heat transmission is extremely excellent, and the reforming reactor can be started very rapidly.

As the heating resistor is disposed inside the reforming reactor, a preheater or the like is unnecessary, and heating an additional portion (apparatus) is not necessary. Therefore, the reforming reactor can be effectively heated, and an electric power consumed for heating an additional portion is decreased.

When a hydrogen-separating film is disposed inside the reforming reactor, the hydrogen-separating film is rapidly heated and the temperature of the hydrogen-separating film reaches a temperature sufficient for hydrogen separation in an early stage. Therefore, hydrogen is effectively recovered from the starting stage. Further, when a hydrogen-separating film is disposed inside the catalyst, heat is transmitted to the hydrogen-separating film more efficiently, and hydrogen is recovered more effectively.

The reforming reactor of the present invention is lightweight and compact because an additional preheater or the like is not required. Therefore, the reforming reactor is particularly suitable to be mounted on an electric automobile in which the power source is a combination of a fuel cell and a storage cell. When the reforming reactor of the present invention is used as an apparatus for supplying fuel hydrogen to a fuel cell, charging a storage cell with electricity from a fuel cell can be started in a short period of time, and the capacity of the storage cell can be easily planned. The storage cell may be used as a heating resource for a heating resistor. Thus, the electric power can be used effectively.

Incidentally, when the reforming reactor of the present invention is applied to an electric automobile, the fuel cell may be a fuel cell of a phosphate type or a fuel cell of a solid high-molecular electrolyte type. The latter is preferable because the latter has a lower operating temperature (about 100° C. or lower), and the latter is more compact and lightweight. Particularly, the latter has a strict CO allowance of 10 ppm or less to toxicoid which Pt as an electrode catalyst sustains. Application of the latter to the reforming reactor of the present invention, in which a hydrogen-separating film is used, gives a greater effect. Preferred hydrocarbons and/or hydrocarbons containing oxygen used in a starting material for reforming include methanol and ethanol because methanol and ethanol arc liquid at ordinary temperature under ordinary pressure and are excellent in storage and transport.

The present invention is hereinbelow described in more detail by means of Examples with reference to drawings. However, the present invention is not limited to the Examples.

(Example 1)

FIG. 1 is a schematic explanatory view showing an embodiment of a reforming reactor of the present invention. The apparatus uses a combination of a fuel cell and a storage cell. A reforming reactor 11 is provided with a catalyst 10 and a heating, resistor 12. The heating, resistor 12 is embedded in the catalyst 10. The catalyst 10 has a function of promoting partial oxidation, decomposition, and reforming reactor. The heating resistor 12 is not particularly limited and may be formed in various configurations and from various materials including, for example, a linear metallic heater, a metallic heater having a shape of a plate, and a metallic heater having a shape of a coil. Incidentally, these metallic heaters may be coated with an insulating material as necessary.

Reforming reactor 11 is connected with a fuel cell 16 via a hydrogen-separating apparatus 14. The fuel cell 16 is connected with a storage cell 18. The storage cell 18 is connected with the reforming reactor 11.

Now, the operating conditions of the apparatus shown in FIG. 1 will be described. A hydrocarbon, water, and oxygen supplied to a reforming reactor 11 are heated at a predetermined temperature, and a partial oxidation reaction and reforming reaction are caused, generating mainly hydrogen and carbon dioxide. The obtained hydrogen and carbon dioxide are supplied to a hydrogen-separating apparatus 14, and hydrogen is separated. The separated hydrogen is supplied to a fuel cell 16. A non-permeated gas containing hydrogen is discharged. Electric power generated by a fuel cell 16 is sent to a storage cell 18 to be stored. The electric power stored in the storage cell 18 can be used for heating reforming reactor 11.

(Performance Evaluation)

A reforming reactor 11 was heated by supplying electric power from a storage cell 18. It took about 30 seconds for the reforming reactor 11 to be heated up to 300° C. at which the reforming reaction and the partial oxidation reaction proceed. The electric power required for the heating was 50 KJ.

A mixed gas of methanol, air, and water vapor was supplied to a reforming reactor 11 heated as described above. Immediately, the partial oxidation reaction and the reforming reaction were started. Therefore, non-reacted gas was not discharged.

(Comparative Example 1)

Figure 4:
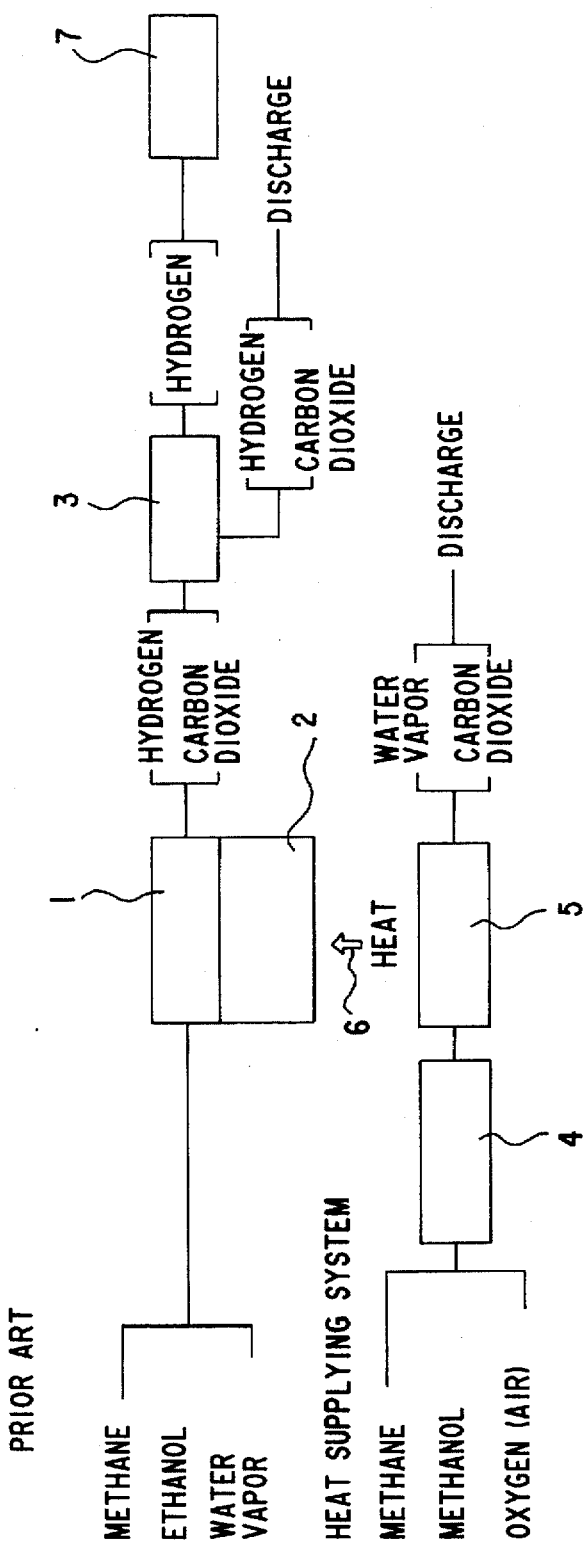
FIG. 4 is a schematic explanatory view showing an embodiment of a conventional reforming reactor.

In an apparatus shown in FIG. 4, a preheater 4 was heated by electric power, and it took about 60 seconds for the preheater 4 to be heated up to a predetermined temperature. Further, it took about 30 seconds for a catalytic combustion apparatus 5 to be heated up to a predetermined temperature. Therefore, heating was required for a total of more than 90 seconds. As a result, the electric power required for the aforementioned heating was 200 KJ. Further, a non-reacted gas was discharged for 30 seconds after the preheater 4 was heated and until a catalytic combustion apparatus was heated.

Compared with the aforementioned result of Comparative Example 1, it can be understood that a reforming reactor of the Example 1 which is within the range of the present invention is excellent in a starting property and contributes to energy saving.

(Example 2)

Figure 2:
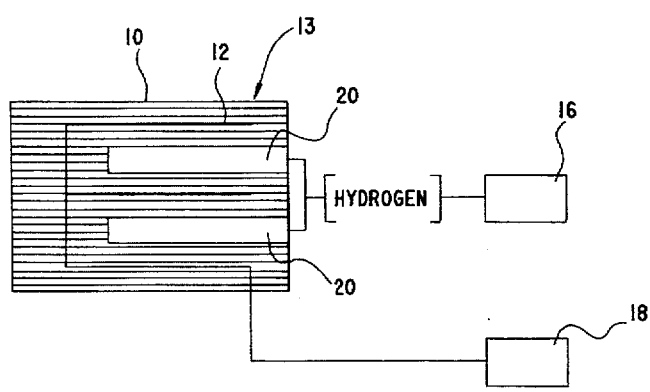
FIG. 2 is a schematic explanatory view showing another embodiment of a reforming reactor of the present invention.

FIG. 2 shows another embodiment of a reforming reactor of the present invention. The same reference numbers are used for the same members described above, and the description is omitted here.

In FIG. 2, a hydrogen-separating film 20 is disposed inside a catalyst 10. Since the hydrogen-separating film 20 is thus disposed in this embodiment, a hydrogen-separating film 20 is rapidly heated up to the temperature at which hydrogen is selectively permeated. Therefore, hydrogen can be effectively recovered in the early stage.

As a result of the same performance evaluation as in Example 1, a hydrogen-separating film 20 was heated up to 300° C. at which a hydrogen-separating film 20 exhibits hydrogen permeability at the same time (about 30 seconds later) that the temperature of a reforming reactor 13 reaches a predetermined temperature, and the recovery of hydrogen was excellent.

(Example 3)

Figure 3:
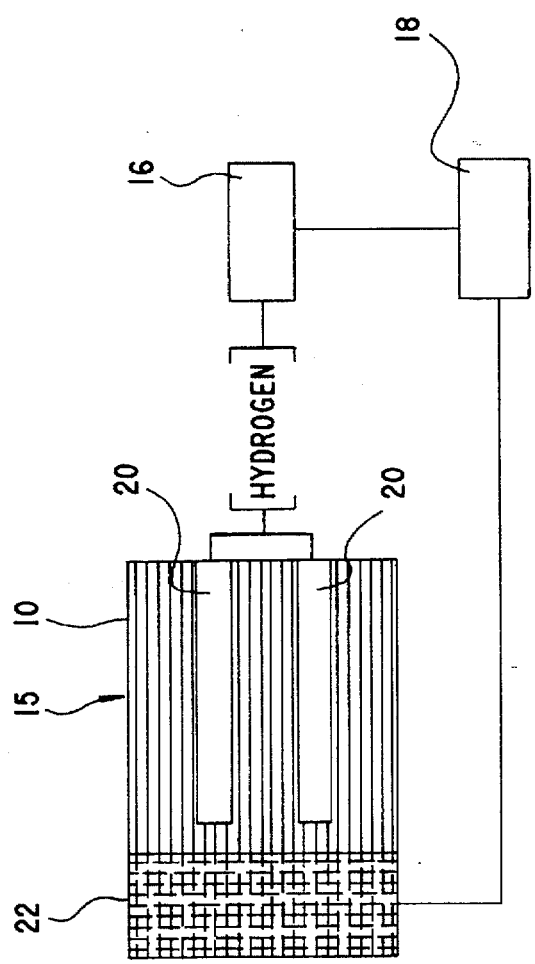
FIG. 3 is a schematic explanatory view showing still another embodiment of a reforming reactor of the present invention.

FIG. 3 shows still another embodiment of a reforming reactor of the present invention. In FIG. 3, a honeycomb resistor 22 is disposed upstream (the side to which methanol or the like is supplied) of a catalyst 10. A hydrogen-separating film 20 is disposed in a catalyst 10.

The apparatus shown in FIG. 3 was subjected to performance evaluation as in Example 1. It took 10 seconds for a honeycomb resistor 22 to be heated up to 300° C. at which a catalytic reaction proceeds. It took only 20 seconds for a reforming reactor 15 to be heated up to 300° C. The electric power required for the heating was 20 KJ.

As described above, according to the present invention there is provided a reforming reactor which can start rapidly with high thermal efficiency and which is excellent in recovery of hydrogen because a heating resistor is installed in the reforming reactor. There is further provided a reforming reactor which is compact and for which electric-power consumption is decreased.

The reforming reactor is effectively heated in the starting stage. Therefore, hydrogen gas can be produced within a short period of time, and discharge of non-reacting gas is reduced. Further, hydrogen can be effectively recovered by a hydrogen-separating film from the beginning of the starting stage.

What is claimed is:

1. In a reforming reactor comprising a reforming catalyst and wherein a hydrocarbon is mixed with water and oxygen and the mixture heated and contacted with the reforming catalyst to partially oxidize, decompose and reform the hydrocarbon to form hydrogen and carbon dioxide, the improvement comprising a heating resistor embedded in said catalyst and a hydrogen separating film disposed inside said catalyst.

2. A reforming reactor as recited in claim 1, wherein the heating resistor has a honeycomb structure.

3. A method of producing hydrogen from a hydrocarbon comprising:

mixing a hydrocarbon with water and oxygen;

contacting the mixture of hydrocarbon, water and oxygen in a reforming reactor with a reforming catalyst having a heating resistor embedded therein;

heating said catalyst and said mixture with said heating resistor to partially oxidize, decompose and reform the hydrocarbon to form hydrogen and carbon dioxide; and separating the hydrogen from the carbon dioxide with a hydrogen separating film disposed inside said catalyst.

4. The method of claim 3, wherein the heating resistor has a honeycomb structure.

* * * * *